United States Patent [19]

Long, Jr. et al.

[11] Patent Number: 4,796,358

[45] Date of Patent: Jan. 10, 1989

[54] METHOD AND APPARATUS FOR ASSEMBLY OF ELECTRICAL CABLE

[75] Inventors: Alden O. Long, Jr., Carlisle; Robert Volinskie, Hershey, both of Pa.

[73] Assignee: AMP Incorporated, Harrisburg, Pa.

[21] Appl. No.: 169,787

[22] Filed: Mar. 18, 1988

Related U.S. Application Data

[62] Division of Ser. No. 905,902, Sep. 10, 1986, abandoned.

[51] Int. Cl.[4] ........................ H01R 43/04; B23P 19/00

[52] U.S. Cl. ........................................ 29/863; 29/566.3; 29/749; 29/755; 29/861

[58] Field of Search ........................ 29/461, 566, 566.2, 29/566.3, 745, 749, 751, 755, 857, 861, 863, 865

[56] References Cited

U.S. PATENT DOCUMENTS

| | | | |
|---|---|---|---|
| 3,952,392 | 4/1976 | Nijman et al. | 29/566.3 |
| 3,999,270 | 12/1976 | Witte | 29/749 |
| 4,048,711 | 9/1977 | Haller | 29/566.3 |
| 4,085,497 | 4/1978 | Nijman et al. | 29/566.3 |
| 4,180,904 | 1/1980 | Nijman | 29/566.3 X |
| 4,184,244 | 1/1980 | Kaczmarek | 29/566.3 |
| 4,210,997 | 7/1980 | Holt | 29/566.3 |
| 4,446,617 | 5/1984 | Lydell | 29/749 X |

*Primary Examiner*—Carl J. Arbes
*Attorney, Agent, or Firm*—Allan B. Osborne

[57] ABSTRACT

Electrical cable assemblies formed by joining two halves or sections with each section having grooves extending from end to end and outwardly projecting ribs alongside the grooves with the grooves and ribs on one section being laterally shifted relative to the other section so that when the sections are brought together, the ribs enter facing grooves on the opposing sections to cooperatively form passageways for electrical contacts positioned in the grooves. A fixture useful in assembling the electrical members and a method are also disclosed.

7 Claims, 10 Drawing Sheets

METHOD AND APPARATUS FOR ASSEMBLY OF ELECTRICAL CABLE

This application is a divisional of application Ser. No. 905,902 filed Sept. 10, 1986, now abandoned.

FIELD OF THE INVENTION

The present invention relates to electrical cable assemblies, formed from a pair of sections joined together and electrical contacts therein. Further, the present invention relates to a method and apparatus for dressing and terminating wires in the contacts, loading the contacts in each of the two sections and bringing the sections together to form an electrical cable assembly. Further, a metal shield may be placed about the two sections.

BACKGROUND OF THE INVENTION

Electrical connecting of mating members containing electrical contacts; e.g., pins and sockets such as the well known D-type connectors, are made, sold and used throughout the world. Each mating member includes a dielectric housing and electrical contacts. The housing includes two sections which are joined end to end and secured together by a metal shell. Contacts to which wires in a multiple-wire cable have been terminated are inserted into passages in the housing by hand, one at a time. As each such member has from nine to thirty-seven contacts, it is readily apparent that assembling these members by hand is costly, time consuming and subject to error.

It is now proposed to provide electrical cable assemblies and a fixture and method for assembling such assemblies which substantially eliminates much of the hand operations and accordingly is less expensive, easier and faster to assemble and accurate.

SUMMARY OF THE INVENTION

According to the present invention, electrical cable assemblies are disclosed which are formed from two sections and electrical contacts. Grooves extend from one end to another end of the sections and outwardly projecting ribs are provided alongside the grooves. The grooves and ribs on one section are laterally shifted so that when the two sections are brought together, the ribs enter the grooves and cooperatively form cavities for the contacts. An apparatus useful in assemblying the cable assemblies is also disclosed along with a method of assembly.

DESCRIPTION OF THE INVENTION

Figure 1:
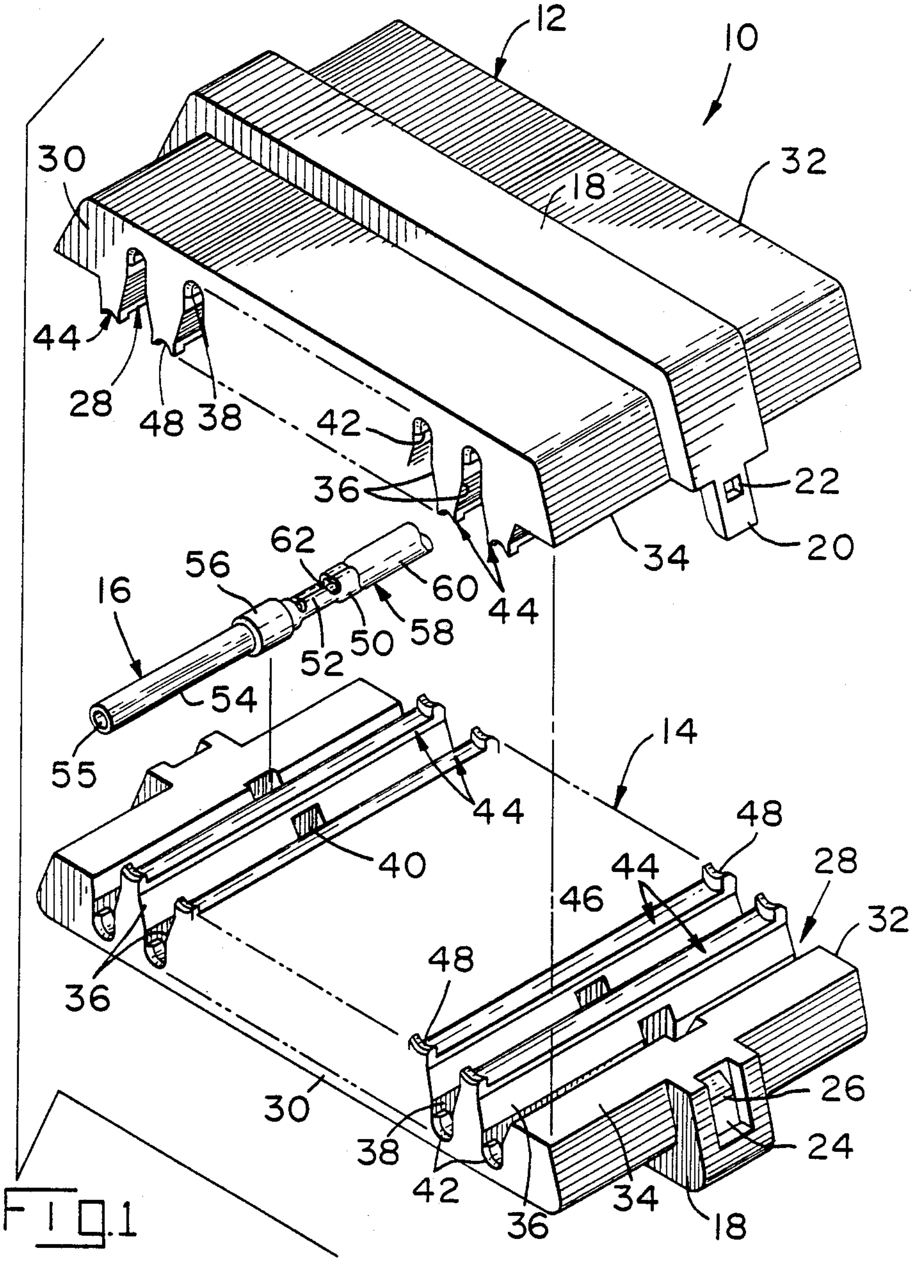
FIG. 1 is an exploded perspective view of parts of an electrical cable assembly of the present invention.

As shown in FIG. 1, electrical cable assembly 10 includes dielectric first and second sections 12,14 respectively and electrical contacts 16.

Sections 12,14 include, on the outer surfaces, rib 18 having, in the embodiment shown, cooperating latching devices which on section 12, includes tabs 20 with holes 22 therethrough and on section 14, includes recesses 24 with outwardly projecting lugs 26 thereon. Other than these latching devices, which are not always required as will be shown below, sections 12,14 are substantially identical but are not mirror images of each other as will be apparent from the following description thereof.

Each section 12,14 includes grooves 28 opening out at respective ends 30,32 and onto inner surface 34. Grooves 28 in section 12 are laterally offset by one-half the width relative to the location of grooves 28 in section 14. The walls of grooves 28 include slanted portion 36 on each side and a U-shaped intermediate portion 38 extending between and joining portions 36. Notches 40, extending from one slanted portion 36 to the other through portion 38, are provided in each groove 28. An arcuate half collar 42 is located in each portion 38 adjacent respective ends 30,32.

Ribs 44, having an arcuate surface 46, project above interior surface 34 and extends between ends 30,32 and are between and on the outside of each groove 28 in first section 12 and only between each groove 28 in second section 14. An arcuate half collar 48 is provided on ribs 44 adjacent respective ends 30, 32. Upon bringing sections 12,14 together, ribs 44 are conformably received in respective grooves 28 with the U-shaped portions 38 of grooves 28 cooperating with arcuate surfaces 46 on ribs 44 to form elongated, cylindrical passageways (not shown) and respective half collars 42,48 cooperate to form annular openings of reduced diameters (not shown) to the passageways. With groves 28 on section 12 being laterally shifted relative to grooves to 28 on section 14, the passageways formed are in two rows with one row offset laterally relative to the other row.

Sections 12,14 are molded from a dielectric material such as any suitable thermoplastic.

Contact 16 includes insulation gripping ferrule 50 at back end 51, conductor gripping ferrule 52 in front of ferrule 50, socket 54 at front end 55 and annular ring 56 located between ferrule 52 and socket 54. As shown, wire 58 has been terminated to contact 16 with ferrule 50 crimped around insulation 60 which covers conductor 62 and ferrule 52 crimped around a bared end of conductor 62.

Contacts 16 are received in grooves 28 with annular rings 56 being frictionally received in notches 40 and back and front ends 51,55 respectively being located immediate adjacent and within half collars 42 at respective ends 32,30.

A method of assembling an electrical member 10 will be more fully described below. As is apparent sections 12 and 14 are brought together with inner surfaces 34 abutting and ribs 44 entering grooves 28 in which contacts 16 have been positioned after being attached to wires 58 (FIG. 4) by crimping. Sections 12, 14 are latched together by lugs 26 entering holes 22 as tabs 20 slide into recesses 24.

With regard to the cooperating locking devices, an alternative embodiment of sections 12,14 would be one with each section having a finger 26 on one side and recess 20 on the opposite side. In still another embodiment, locking devices would be omitted altogether and sections 12,14 held together by a metal shell as will be described below or bonding through ultra-sonics or adhesives.

Figure 2:
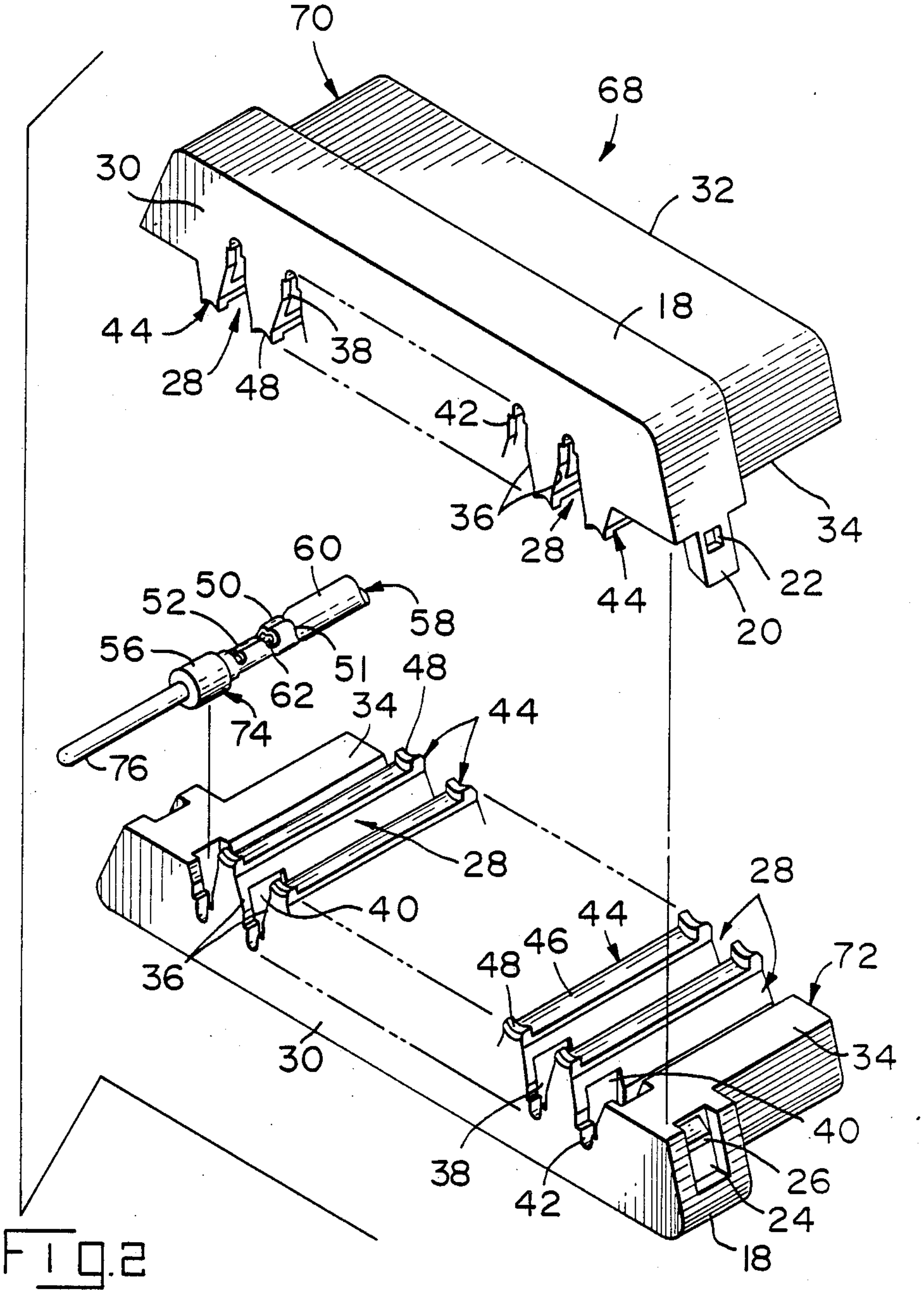
FIG. 2 is an exploded perspective view of a second electrical cable assembly of the present invention.

FIG. 2 shows mating assembly 68 which includes first and second sections 70,72 respectively and electrical contact 74.

With one exception, sections 70,72 are identical to sections 12,14 respectively and accordingly the same description and reference numerals apply. The one exception is that ends 30 are immediately adjacent rib 18 on sections 70,72 so that pins 76 on contacts 74 extend forwardly of end 30 when positioned therein.

Pin contact 74, similar to contact 16, includes insulation gripping ferrule 52, and annular ring 56. Extending forwardly of ring 56 is pin 76 which is slidingly received in socket 54 in contact 16. Wire 58 is terminated therein the same manner as described with respect to contact 16.

Contacts 74 may be screw machined or stamped and formed with the preferred material being phosphor bronze.

Sections 70,72 are latchably joined together in the same manner as described above with respect to sections 12,14.

Contacts 74 are conformably received in grooves 28 with rings 56 being frictionally received in notches 40, pins 76 extending forwardly of ends 30 and wire 58 extending outwardly from ends 32.

Both mating assemblies 10,68 respectively, may further include a metal shell which is described below and shown in FIG. 10.

Figure 3:
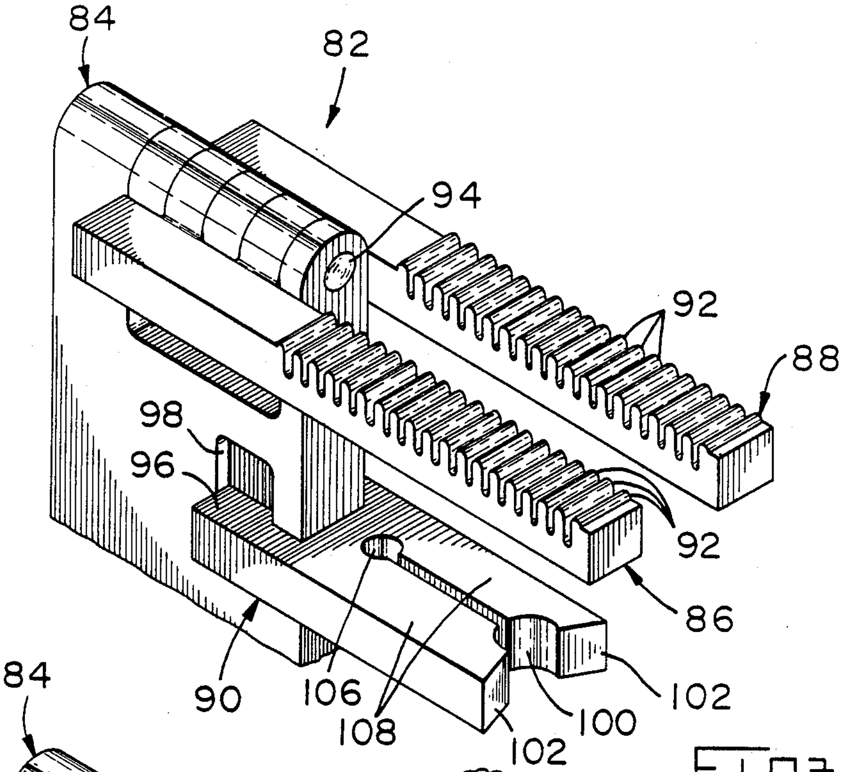
FIG. 3 is a perspective view of an apparatus useful in assemblying the electrical cable assemblies of FIGS. 1 and 2.

FIG. 3 shows apparatus 82 useful in assembling assemblies 10,68. Apparatus 82 includes stand 84 on which are pivotally mounted parallel arms 86,88 and cable gripping vise 90.

Figure 9:
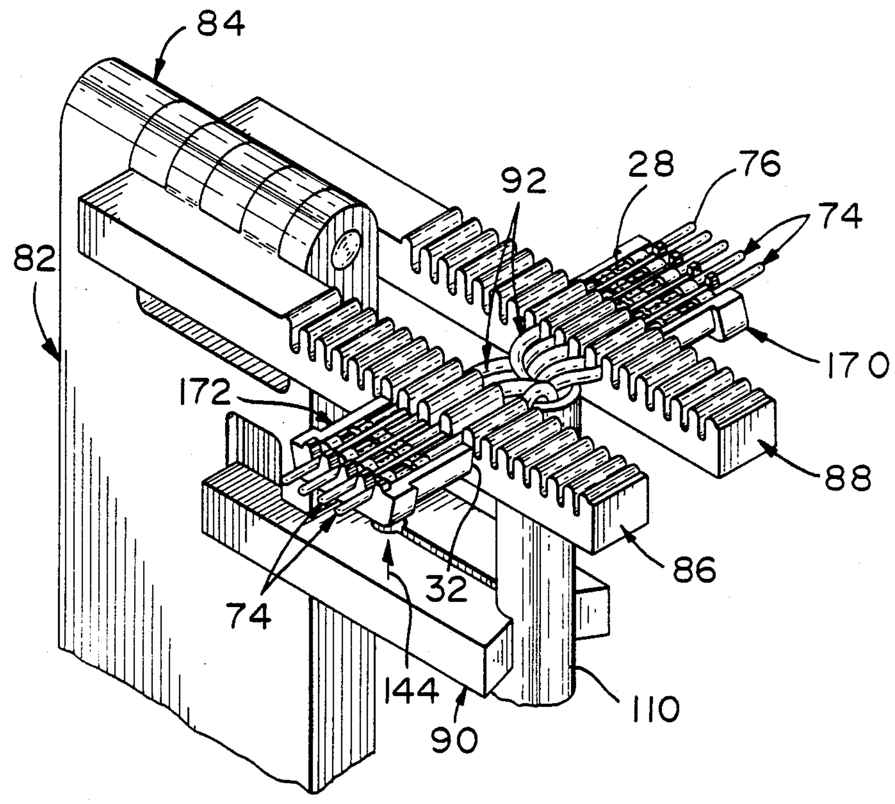

Each arm 86,88 includes a plurality of transverse grooves 92 with grooves 92 on arm 86 displaced axially by one half the width relative to the location of grooves 92 on arm 88. Arms 86, 88 pivot about pin 94 in stand 84 to bring grooves 92 into a facing relation as shown in FIG. 9.

Cable gripping vise 90 is made from any suitable semi-rigid, resilient material. Vise 90 is bifurcated at one end to provide inwardly projecting fingers 96 which are slidingly received in recesses 98 on opposing sides of stand 84 so that vise 90 may move towards and away from arms 86,88.

The outwardly projecting end of vise 90 includes a semicircular cable portion 100 with beveled lead-in ends 102. Slot 104, intersecting portion 100, extends back to hole 106 to define parallel arms 108 which are resilient and can be spread apart to admit cable (FIG. 4) of various diameters.

FIGS. 4 through 10 illustrate the method of assembling cable assembly 168 which is a modified assembly 68 as will be described below.

Figure 4:
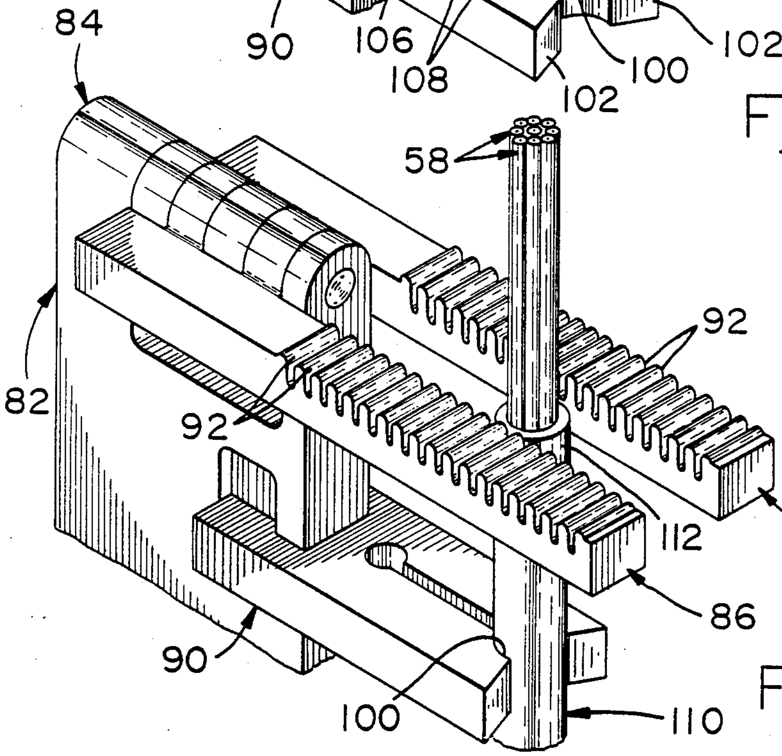
FIGS. 4 through 10 are perspective views illustrating a method of assemblying one electrical cable assembly.

As show in FIG. 4, arms 86,88 are open; i.e., grooves 92 are facing upwardly and cable 110 has been placed and retained in cable portion 100 of vise 90. Insulation 112 of cable 110 has been removed from an end thereof to expose ends of wires 58 contained therein.

Figure 5:
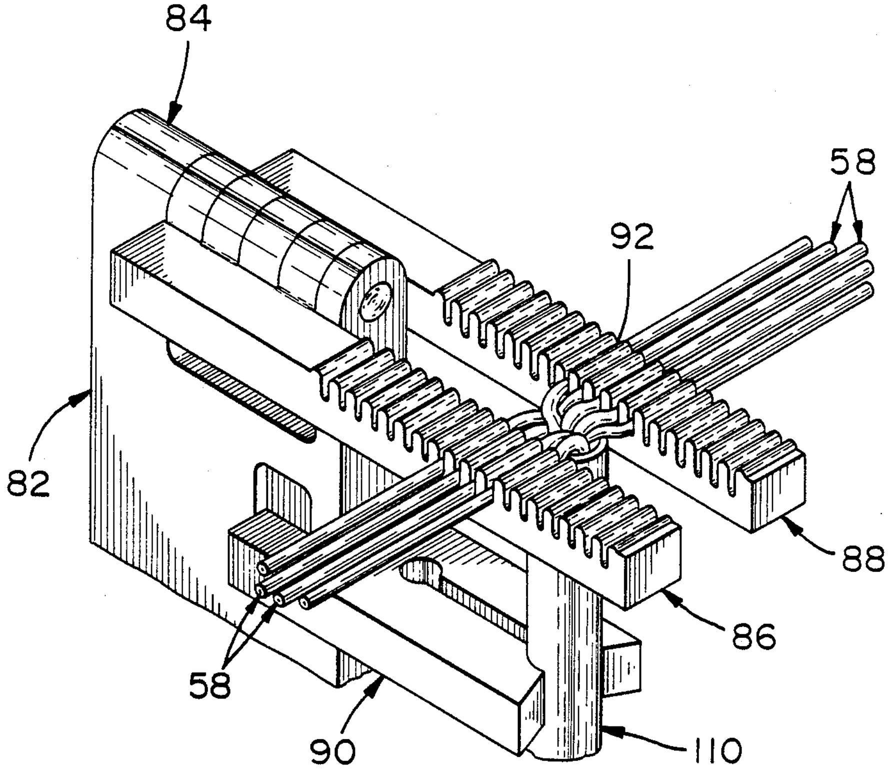

In FIG. 5, wires 58 have been placed in respective grooves 92 in respective arms 86,88 with the wire ends extends laterally outwardly.

Figure 6:
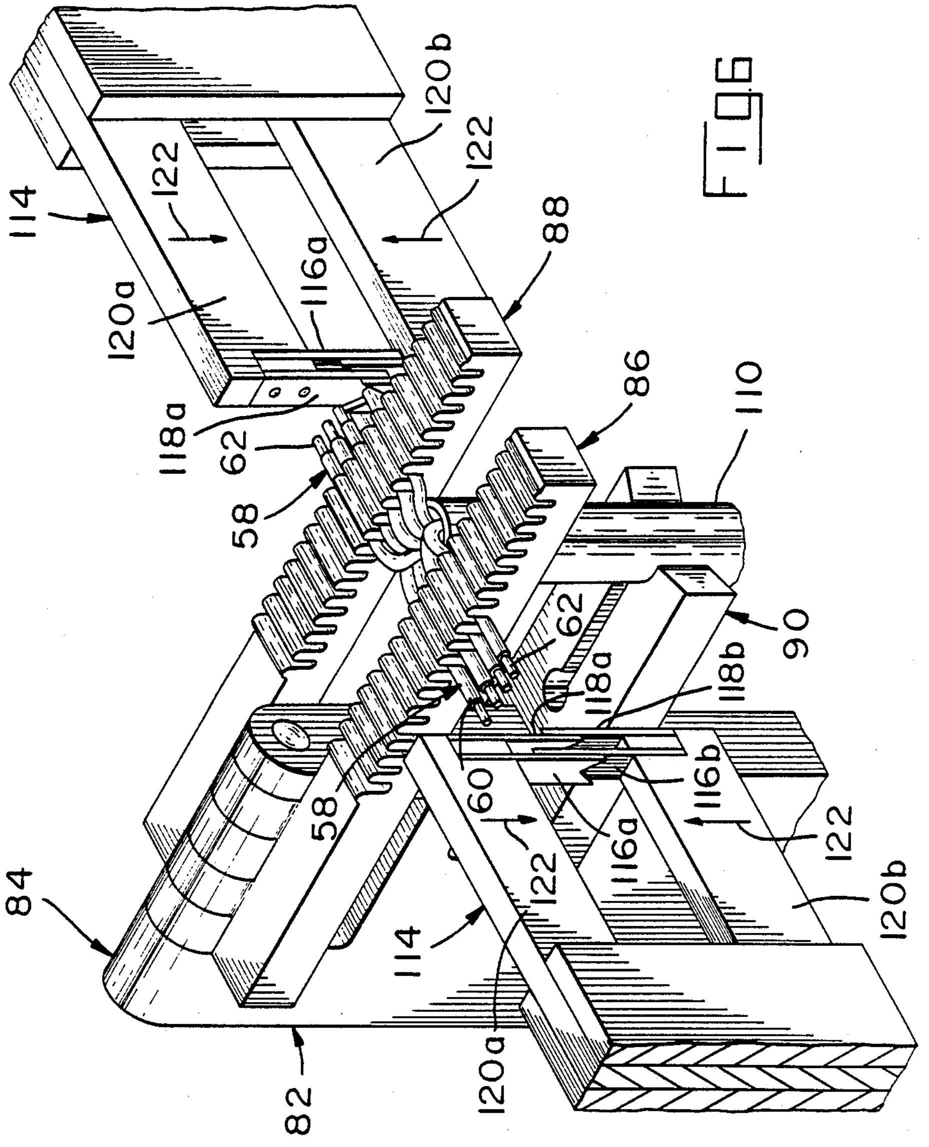

As shown in FIG. 6, tools 114 are now provided to cut wire 58 and strip insulation 60 therefrom. Each tool 114 includes upper and lower cutting blades 116 *a,b* respectively and upper and lower insulation stripping blades 118 *a,b* respectively. Blades 116,118 are mounted on movable upper and lower arms **120*a,b* respectively. Tools 14 are advanced a predetermined distance from respective arms 86, 88 to receive given wires 58 between blades 116,118 which would be in the open position (not shown). Blades 116,118 are then closed by upper and lower arms 120*a*, respectively moving towards each other, as indicated by arrows 122, to cut the length of wire 58 extending beyond that required and to strip insulation 60 from the end of the remaining wire 58 to bare an end of conductor 62. This step is successively repeated for each wire 58 extending outwardly from arms 86,88**.

A modified tool 114 (not shown) would be one having a plurality of blades 116,118 on wider arms 120 so that a number of wires 68 could be prepared simultaneously.

Figure 7:
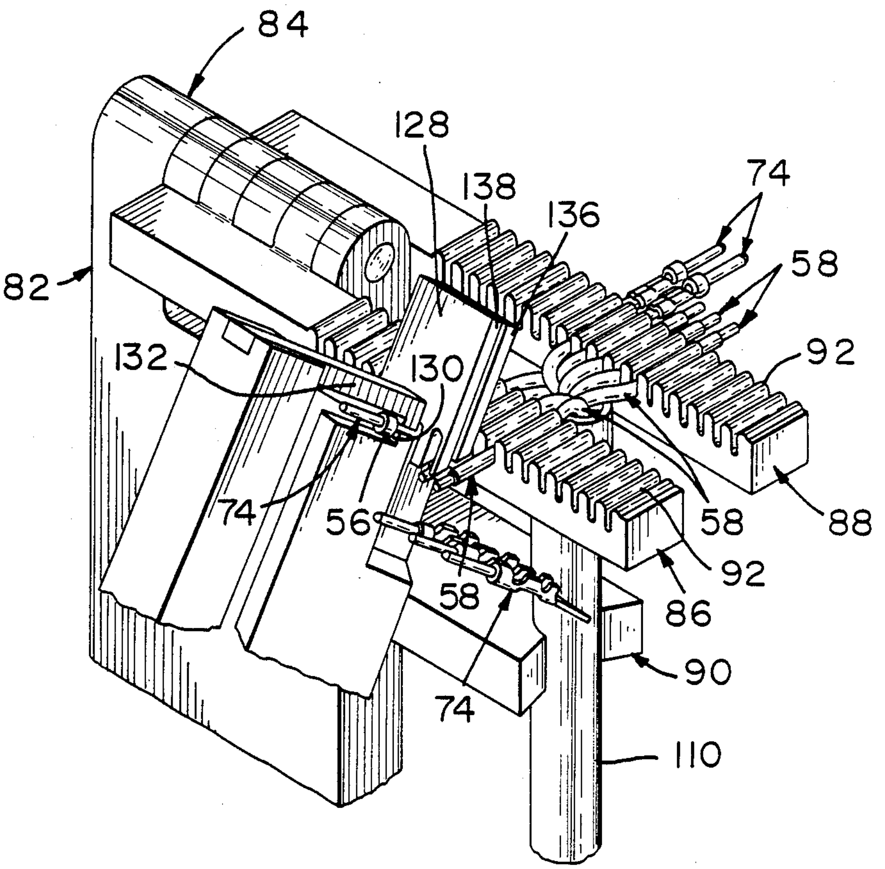
Figure 8:
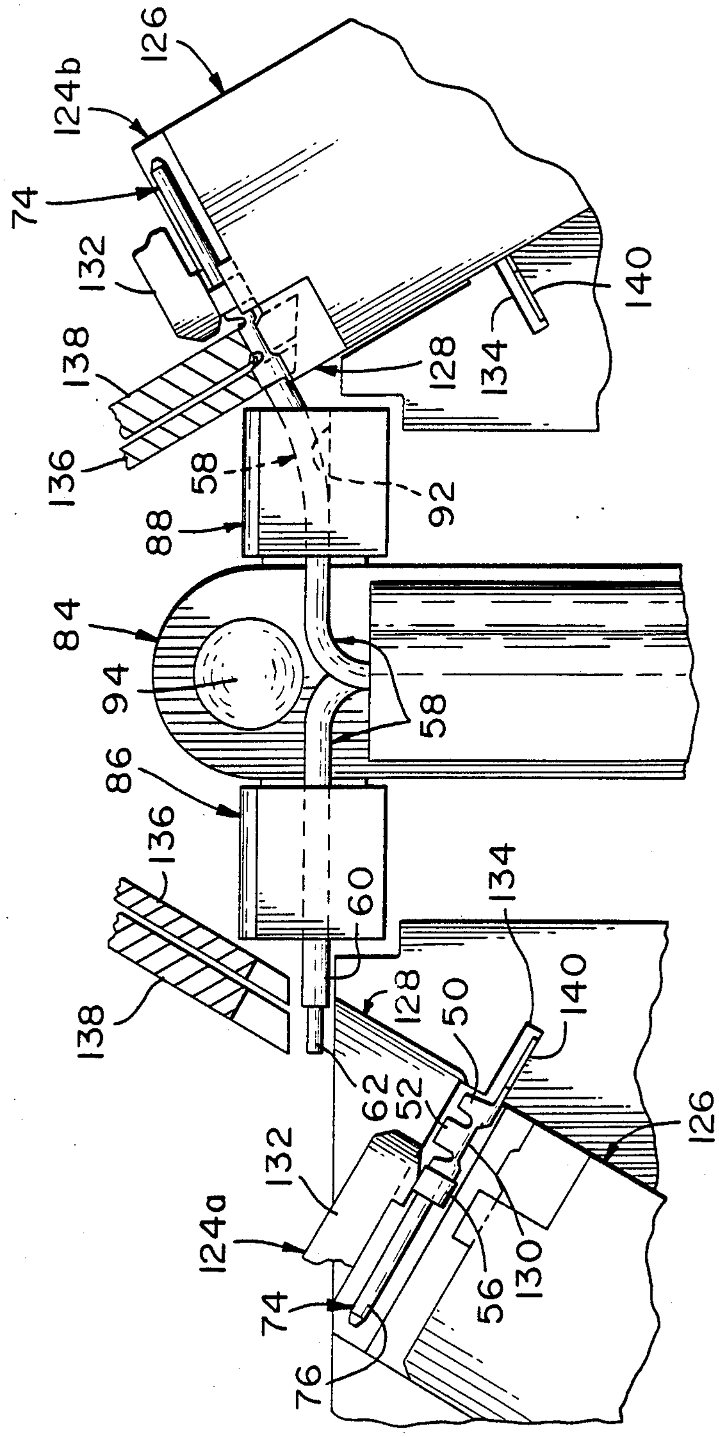

FIGS. 7 and 8 illustrate the steps of crimping contacts 74 to wires 58 by means of identical crimping tools **124*a* and b positioned adjacent respective arms 86,88 (tool 124*b* has been omitted from FIG. 7). Tools 124*a,b* which are shown only generally; e.g., the supporting structure and feeding mechanisms have been omitted for clarity, include moving section 126 and stationary section 128. Anvil 130 and holding block 132 are on moving section 126 while shear blade 134, insulation ferrule indentor 136 and wire ferrule indentor 138 are on stationary section 128**.

With reference to both FIGS. 7 and 8, a contact 74, attached to carrier strip 140 is advanced to lie over anvil 130 which is very thin, being only slightly wider than contact 74. As section 126 begins to travel obliquely upwardly, anvil 130 picks up the overlying contact 74 and immediately thereafter holding block 132 is encountered which abuts annular ring 56 on contact 74 to hold contact 74 securely and squarely and squarely on anvil 130 to prevent moving, particularly rolling motion. The upwardly traveling section 126 passes shear blade 134 which separates contact 74 on anvil 130 from carrier strip 140. Next, prepared wire 58 is encountered and received in ferrules 50,52. As the thin anvil 130 and contact 74 pick up wire 58 and pass between wires 58 on each side thereof, the wire 58 lying in contact 74 is bent up out of the plane of the adjacent wires lying grooves 92 in appropriate arms 86,88. Contact 74 on anvil 130 then enter respective indentors 136,138 and ferrules 50,52 are crimped about respective insulation 60 and conductor 62 of wire 58 as shown in tool **124*b* on the right hand side of FIG. 8. Moving section 126 then returns to its original position to be shifted to the next wire 58 or in the alternative apparatus 82 would be indexed to bring the next wire 58** into termination position.

FIG. 9 shows the step of placing contacts 74 into sections 170,172 which differ only from sections 70,72 of cable assembly 68 shown in FIG. 2 by not having cooperating latching devices, i.e., holes 22 in tabs 20 and lugs 26 in recesses 24.

As shown in FIG. 9, sections 170,172 are brought up, as indicated by arrow 144, by a feeding mechanism (not shown) and pushed onto wire terminated contacts 74. Sections 170,172 are retained on contacts 74 by annular rings 56 on contacts 74 being frictionally received in notches 40 in grooves 28 as noted above. Ends 32 on sections 170,172 are against respective arms 88, 86.

Figure 10:
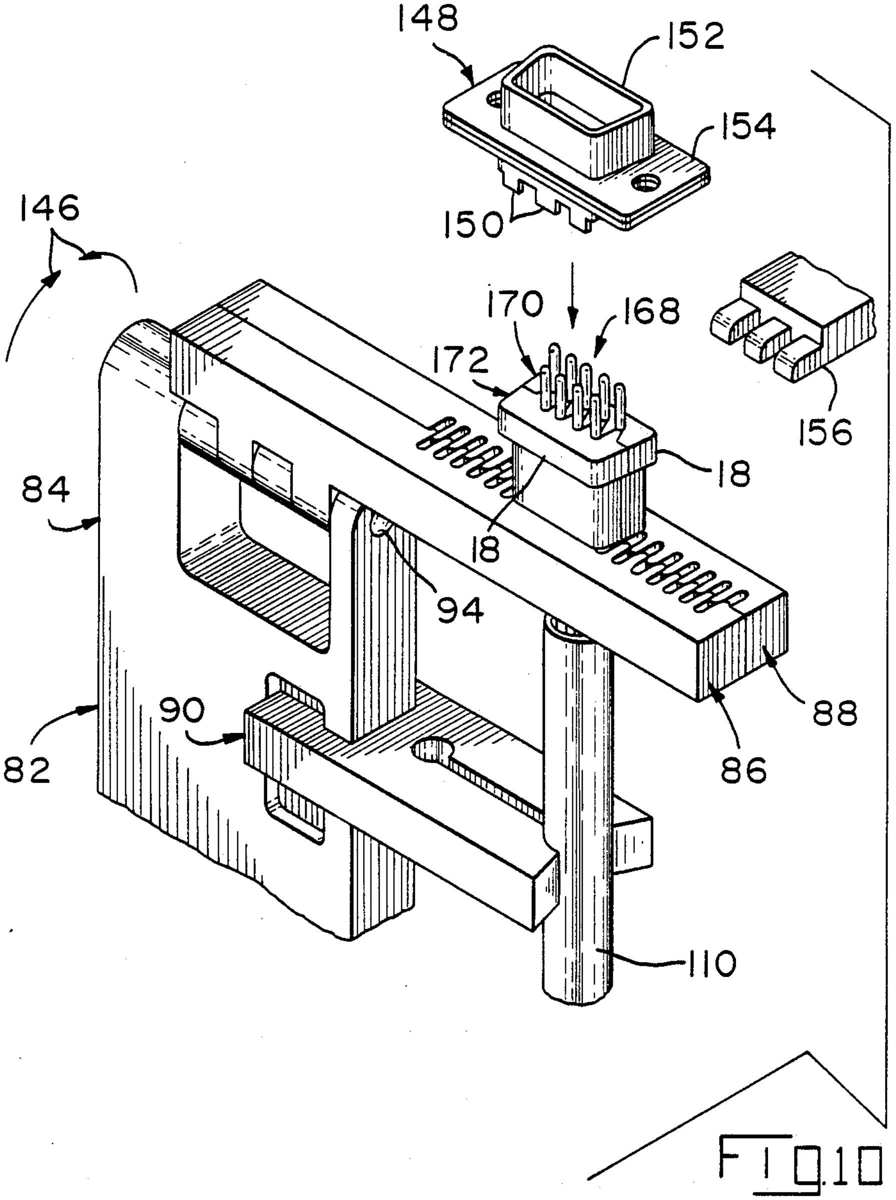

The final assembly step is shown in FIG. 10. Arms 86,88 are pivoted about pin 94 as indicated by arrows 146 to bring sections 170,172 against each other to form cable assembly 168. Note that vise 90 has moved upwardly to accommodate the shift in location of sections 170,172.

Metal shell 148 is then placed onto assembly 168 to secure sections 170,172 together.

Figure 11:
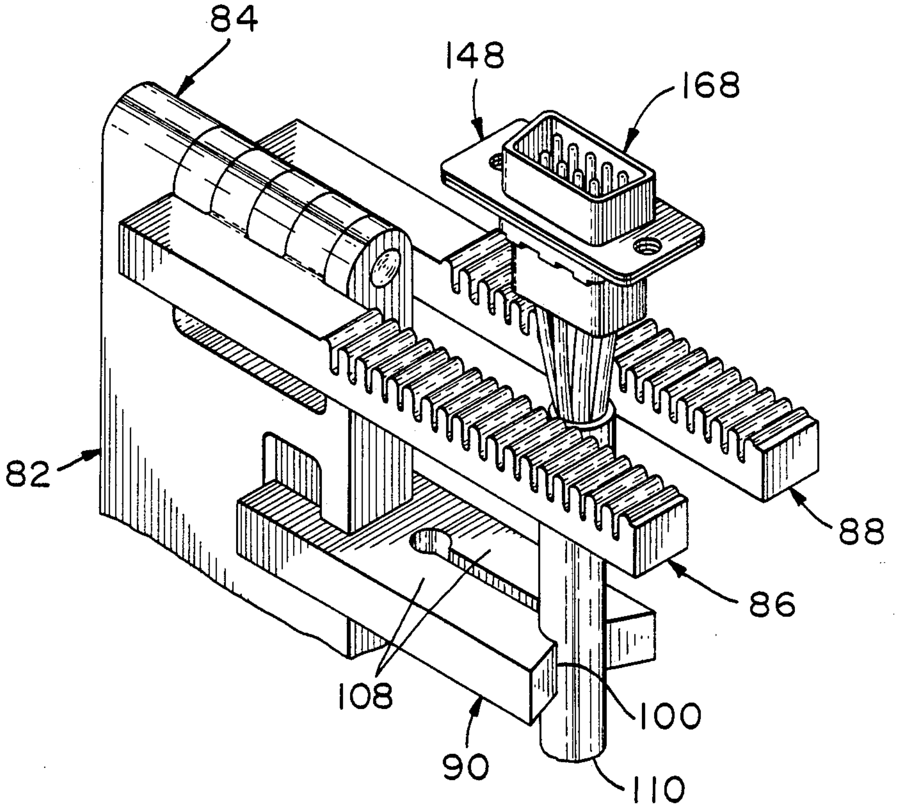
FIG. 11 is a perspective view showing the removal of the assembled electrical cable assembly from the apparatus.

Metal shell 148 includes fingers 150 on one end and shroud 152 on the other end with mounting flange 154 in between. Fingers 150 slip over rims 18 and are pressed underneath by indentors 156 (only one shown) to secure shell 148 to and hold sections 170,172 together as shown in FIG. 11. Shroud 152 surrounds and protects pins 76. Metal shell 148 could have alternative latching features (not shown) which would eliminate the need for indentors 156.

As noted above, as sections 170,172 come together, ribs 44 enter facing grooves 28 to secure contacts 74 therein.

In FIG. 11, arms 86,88 on stand 84 have been pivoted to the open position to release cable assembly 168 therefrom. Cable 110 is removed from cable portion 100 in vise 90 by pulling it outwardly.

Apparatus 82 can also be used to assembly cable assembly 10 with or without latching devices, cable assembly 68 and other like electrical cable assemblies.

As can be discerned, electrical cable assemblies have been disclosed which are formed from two halves or sections with each section having grooves extending from end to end and outwardly projecting ribs extending alongside the grooves. The positioning of the ribs and grooves on one section are laterally shifted relative to the ribs and grooves on the other section so that upon bringing the two sections together, the ribs on one enter into the grooves on the other to cooperatively form passageways in which are positioned electrical contact members. Further disclosed is an apparatus comprising a stand having two arms thereon for holding wire extending outwardly from each arms, in a predetermined arrangement while tools trim and strip the wire and terminate the dressed wire in either pin or socket contacts. After dressing and terminating the wire, the two sections are brought to the stand and positioned on the contacts and the arms pivoted to bring the sections together to form the electrical cable assembly. A metal shell may then be added thereto if desired.

We claim:

1. A method for assembling an electrical cable assembly comprising first and second section means having groove means extending from end to end and outwardly projecting rib means extending alongside said groove means, said groove and rib means on said first section means being laterally shifted relative to said groove and rib means on said second section means and electrical contact means for being disposed in said groove means, said method comprising the steps of:

spreading a plurality of wires outwardly in two opposite directions;

trimming said wires to predetermined lengths and stripping insulation from the ends thereof to bare a conductor therein;

terminating said bared conductors to said electrical contact means;

placing said contact means attached to said wires extending outwardly in one of said two opposite directions in said groove means in said first section means; placing said contact means attached to said wires extending outwardly in another of said two opposite directions in said groove means in said second section means; and forming said electrical cable assembly by joining said first and second section means together with said rib means on said first and second section means entering respective said groove means in said first and second section means to cooperatively form passageway means with said contact means therein and said wire attached thereto extending outwardly therefrom.

2. The method of claim 1 further including the step of attaching metal shell means to said first and second section means of said formed electrical cable assembly.

3. A method for assembling an electrical cable assembly comprising first and second section means having groove means extending from end to end and outwardly projecting rib means extending alongside said groove means, said groove and rib means on said first section means being laterally shifted relative to said groove and rib means on said second section means and electrical contact means being disposable in said groove means, said method comprising the steps of:

placing a plurality of wires in grooves of pivotable arm means positioned in a first position and laying said wires in said grooves so that each of said wires extends laterally outwardly from said arm means;

trimming the ends of said wires to predetermined lengths and stripping insulation therefrom to bare conductors therein;

attaching said bared conductors to said contact means;

placing said contact means attached to said wires associated with one of said arm means into groove means in said first section means;

placing said contact means attached to said wires associated with another of said arm means into groove means in said second section means; and moving said arm means to a second position to form said electrical cable assembly by joining said first and second sections means with said rib means on said first and second section means entering respective said groove means in said first and second section means to cooperatively form passageway means with said contact means therein and said wires attached thereto extending outwardly therefrom.

4. An apparatus for use in assembling an electrical cable assembly of the type formed by bringing first and second sections together with each section having wire-terminated electrical contacts therein, said apparatus comprising:

support means:

a pair of arm means with each having transverse grooves on one surface, said arm means mounted on said support means in parallel relation and pivotally movable from a first position where said grooved surfaces are facing in the same direction to a second position where said grooved surfaces are facing each other;

cable retaining means mounted on said support means for retaining an electrical cable therein; and crimping means for crimping the electrical contacts to wires extending through said transverse grooves when said arm means are in a first position.

5. The apparatus of claim 4 wherein said crimping means includes a moving anvil, holding means for holding said electrical contacts on said anvil to prevent contact rolling and stationary indentor means for crimping said wire to wire receiving means on said electrical contacts upon said moving anvil advancing said electrical contacts thereto.

6. The apparatus of claim 5 wherein said anvil is thin enough to pick up a wire extending through one of said transverse grooves without disturbing wires extending through said transverse grooves adjacent thereto.

7. An apparatus for use in making an electrical cable assembly of the type comprising first and second dielectric members having groove means for receiving electrical contact means therein and outwardly-projecting rib means adjacent said groove means with the groove means and rib means on the first dielectric member being laterally shifted relative to the groove means and rib means on the second dielectric member so that as the first and second dielectric members are brought together with the contact means in the groove means, the rib means on the first and second dielectric members are disposed in respective grooves in the second and first dielectric members forming passageway means which receive the contact means therein, said apparatus comprising:

stand means having cable holding means for holding a cable;

arm means pivotally mounted on said stand means and being movable from an open position to a closed position, said arm means having grooves therein in which electrical conductors of the cable are to be disposed when said arm means are in said open position with said conductors extending outwardly from the arm means;

conductor cutting and stripping means for cutting the conductors to a selected length and stripping insulation from the ends thereof thereby exposing conductive means of the conductors;

means for crimping electrical contact means to the conductive means of the conductors, the crimped electrical contacts are disposed in the groove means of the first and second dielectric members and said arm means are moved to said closed position so that the first and second members are moved together with the rib means on each of said members being disposed in respective groove means on the other of said members thereby forming the electrical cable assembly.

* * * * *